US008863182B1

(12) United States Patent  (10) Patent No.: US 8,863,182 B1
Sharifi et al.  (45) Date of Patent: Oct. 14, 2014

(54) IN-STREAM VIDEO STITCHING

(75) Inventors: Matthew Sharifi, Zurich (CH); Graeme Rimmer, Twickenham (GB)

(73) Assignee: Google Inc., Mountain View, CA (US)

( * ) Notice: Subject to any disclaimer, the term of this patent is extended or adjusted under 35 U.S.C. 154(b) by 73 days.

(21) Appl. No.: 13/399,759

(22) Filed: Feb. 17, 2012

(51) Int. Cl.
*H04N 7/10* (2006.01)
*H04N 7/025* (2006.01)

(52) U.S. Cl.
USPC ................................................. 725/38

(58) Field of Classification Search
None
See application file for complete search history.

(56) References Cited

U.S. PATENT DOCUMENTS

| | | | | |
|---|---|---|---|---|
| 7,562,375 | B2 * | 7/2009 | Barrett et al. | 725/38 |
| 7,603,689 | B2 * | 10/2009 | Baldwin et al. | 725/101 |
| 7,870,590 | B2 * | 1/2011 | Jagadeesan et al. | 725/93 |
| 2002/0016961 | A1 * | 2/2002 | Goode | 725/9 |
| 2002/0144262 | A1 * | 10/2002 | Plotnick et al. | 725/32 |
| 2008/0201736 | A1 * | 8/2008 | Gordon et al. | 725/34 |
| 2008/0271067 | A1 * | 10/2008 | Li et al. | 725/32 |
| 2009/0320063 | A1 * | 12/2009 | Barrett | 725/34 |
| 2010/0129056 | A1 * | 5/2010 | Connery et al. | 386/95 |
| 2010/0218231 | A1 * | 8/2010 | Frink et al. | 725/118 |
| 2011/0004899 | A1 * | 1/2011 | Medford | 725/32 |
| 2011/0162024 | A1 * | 6/2011 | Jagadeesan et al. | 725/110 |
| 2013/0024888 | A1 * | 1/2013 | Sivertsen | 725/32 |
| 2013/0097634 | A1 * | 4/2013 | Jin et al. | 725/34 |

* cited by examiner

*Primary Examiner* — Brian T Pendleton
*Assistant Examiner* — Ryan Stronczer
(74) *Attorney, Agent, or Firm* — Amin, Turocy & Watson, LLP

(57) ABSTRACT

Systems and methods are provided herein relating to video editing and more particularly to stitching an insert video within a target video without transcoding. Through dynamically stitching a video, such as an advertisement, within a video, a content provider can transmit a stitched video instead of separate content videos and advertisement videos that a local uncontrolled video player would be responsible for combining and playing. Systems and methods herein provide for receiving a target video and an insert video and dynamically stitching the insert video within the target video to create a stitched video. The stitched video can then be transmitted that plays both the target video and the insert video within the target video, irrespective of the player on which a user views the stitched video.

20 Claims, 14 Drawing Sheets

IN-STREAM VIDEO STITCHING

TECHNICAL FIELD

This application relates to video editing, and more particularly to stitching a video within another video.

BACKGROUND

In streaming videos using a content provider controlled (CPC) video player, content providers can dynamically insert videos, such as an advertisement, using features embedded within the CPC video player. In sharp contrast to streaming videos using a CPC video player, many streaming video environments, such as when using a mobile device, use a video player not controlled by the content provider to stream video content hosted by the content provider. Without control of the video player, a content provider can face challenges in dynamically streaming videos with additional stitched-in video content.

One method to stitch video content within an existing video is to take a host video and an insert video and run both through a transcoder that can decode, re-encode and repackage the host video and the insert video as a new video. However, transcoding a large set of videos can be associated with expensive computational costs, particularly for a large scale content provider. In addition, when stitching a host video and an insert video, such as advertisement, the new video can quickly become stale. For example, an advertisement relating to an upcoming event or a temporary product may not be relevant for the full life cycle of the host video. Therefore, it would be useful to be able to dynamically stitch a video without being dependent on control of the video player or transcoding.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to video stitching. A receiving component can receive an insert video and a target video. A stitching component can stitch the insert video and the target video, without transcoding, to generate a stitched video. A transmission component can transmit the stitched video.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
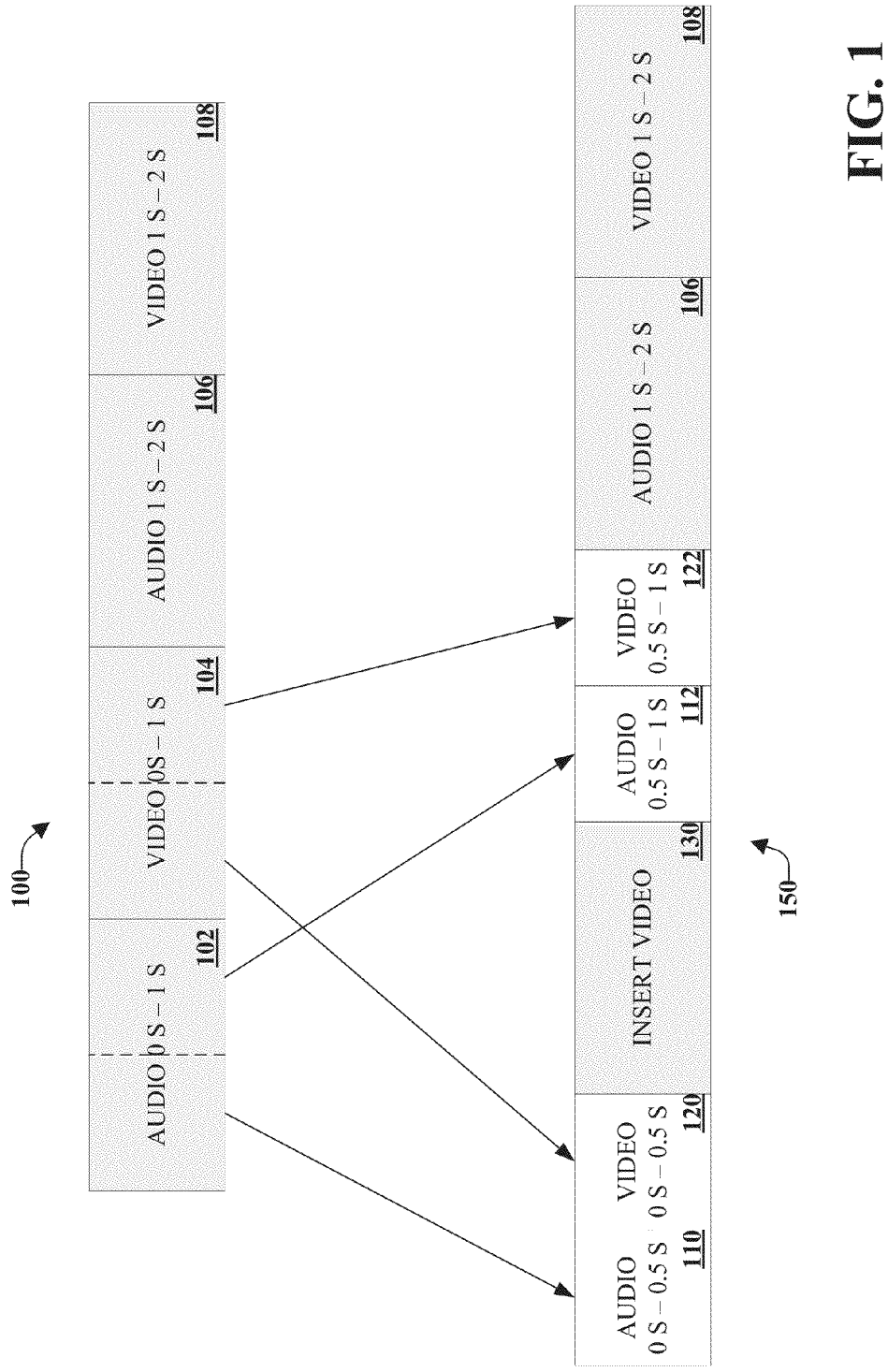
FIG. 1 is an example block diagram of aspects relating to video stitching in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Dynamically stitching an insert video into a host video can offer advantages in inserting videos, such as advertisements, within hosted video content. For example, a content provider may host thousands of videos and wish to place advertisements within the hosted videos when users are watching the hosted videos. A content provider may desire to continually update the content of the insert video (e.g., advertisements) and have it apply to an entire set of the hosted videos or a subset of the hosted videos. One approach is to take the host video and the insert video and run them both through a transcoder that can decode, re-encode and repackage the host video file to include the insert video. However, any time the content provider wished to change the content of the insert video, e.g., to update a stale advertisement or dynamically choose an insert video, such as an advertisement, based on the user who requests the video, the content provider would have to transcode the host video with the new insert video. The computational cost associated with transcoding a large set of videos can be high.

Systems and methods herein provide for dynamically stitching an insert video within a target video, e.g., while streaming over the hyper text transfer protocol ("HTTP"). The stitching occurs without transcoding. The stitching can occur upon a request for access to a target video by a user. For example, a user can request to view a target video; the system can receive an insert video and the target video, and dynamically stitch the insert video into the target video without transcoding. The system can allow a content provider to update the insert video, e.g., with advertisements or other content related to the user or related to the target video the user is requesting. The system can allow for updating the content of the insert video without transcoding. In some embodiments, the resulting stitched video is not stored. In other embodiments, systems and methods described herein provide for storage of a stitched video containing the insert video and the target video.

In one implementation, a mobile device can allow a user to combine two videos captured on and/or residing inside a data store associated with the mobile device. A user can edit a target video to include an insert video stitched into the target video. Thus a user can use a mobile device, which may not have sufficient computational power to transcode a new video, to stitch two videos together without transcoding.

In one implementation, both the target video and the insert video are MPEG-4 Part 14 ("MP4") videos. MP4 videos are capable of being streamed over HTTP. In one such implementation, the insert video and the target video have identical resolutions and are generated using identical transcoder settings. In one implementation, both the target video and the insert video are 3GP videos. 3GP is a multimedia container format used on 3G mobile phones, but can also be played on some 2G and 4G phones. In other implementations, another video container format is employed for both the target video and the insert video.

One step in stitching a video is determining an insertion point on both the audio and video tracks of the target video. The insertion point can be in seconds or milliseconds, for example. In one implementation. the insert video is inserted at any point in the target video that is before an I-frame on the video channel. For example, the video channel of the target video can be searched for the closest I-frame to a desired insert time, e.g., using data inside a sample table time to sample ("stts") atom and a sample table synch sample ("stss") atom. The insert video can be inserted immediately before the I-frame if the video has no B-frames. Alternatively, the I-frame can be duplicated before and after the stitch. Once the insert point on the video channel, e.g., the video insert time, has been determined, the closest corresponding sample on the audio track can be used as an audio insert time. After a video insert time and associated audio insert time have been determined, the insert video can be stitched into the target video. In one implementation, two or more insert videos are stitched back to back into a target video.

Referring to FIG. 1, there is illustrated an example block diagram of aspects relating to video stitching in accordance with implementations of this disclosure. In FIG. 1, a target video 100 (also referred to herein as host media data ("mdat") 100) includes segments 102, 104, 106, and 108. In this disclosure, segments may also be referred to as chunks. In this example, the host media data ("mdat") is interleaved into one-second chunks. For example, segment 102 is the first one second of audio, segment 104 is the first one second of video, and segments 106 and 108 are time 1 S-2 S of audio and video, respectively.

In FIG. 1, a stitched video 150 (also referred to herein as constructed mdat 150) is also depicting, wherein an insert video 130 is incorporated into the target video 100. In this example, the insert video 130 is inserted at a video insert time of 0.5 seconds and an audio insert time of 0.5 second. Byte offsets can be determined, wherein audio_offset and video_offset are the byte offsets of the audio and video samples, respectively, before which the insert video will be stitched, by looking at, at least in part, the sample table sizes ("stsz"), sample table sample to chunk map ("stsc") and sample table chunk offset ("stco") sample tables. Because of interleaving, it can be appreciated that audio_offset and video_offset may not occur at a fixed point, e.g., at the same byte offset, even if they occur at the same time. As the audio insert time is within a one-second audio chunk, segment 102, and the video insert time is within a one-second video chunk, segment 104, the segments are split to insert the insert video at 0.5 seconds. Specifically, audio segment 102 is split into audio segment 110 and 112; video segment 104 is split into video segment 120 and 122.

Segment 110 denotes the first half second of audio segment 102. In one implementation, segment 110 is determined by copying audio segment 102 up to audio_offset.

Segments 120 and 112 exist on either side of the insert video 130. Segments 120 and 112 are sometimes referred to herein as remainders because they exist in (e.g., are inserted into) the stitched video in a different order than how they exist in the target video 100. Segment 120 can be referred to as a "pre-stitch remainder" in that the first half of segment 104, up to video_offset, is split and inserted prior to the insert video 130.

After the pre-stitch remainder 120, the insert video 130 (or media data (mdat) video 130) is inserted unmodified. After the insert video 130 is segment 112. Segment 112 can be referred to as the "post-stitch remainder" in that the second half of segment 102, after audio_offset, is inserted after the insert video 130. Segment 122, after video_offset, and segments 106, and 108 can then be inserted after post-stitch remainder 112 in the order they existed within target video 100.

In an alternate embodiment, not shown in FIG. 1, a partial audio segment can be used as a pre-stitch remainder and a partial video segment can be used as a post-stitch remainder. For example, an mdat could be constructed by first interleaving video segment 120 followed by audio segment 110 as a pre-stitch remainder, followed by insert video 130 in its entirety, followed by video segment 122 as a post-stitch remainder, followed by audio segment 112, followed by remaining full segments 108 and 106.

Along with creating a new mdat 150 of stitched video, sample tables of the stitched video can also be generated based on the sample tables associated with the target video and the insert video. A sample table can be updated for each track. For example, where there is one set of sample tables per track, a file with audio and video tracks will have two sets of tables, one set for audio and one set for video that are both also stitched. For the stts and stsz sample tables, the insert point can be identified from the sample index and the insert video sample tables can be inserted into the target video sample tables. Both the stts and the stsz use a run length, thus, a run can be split if the insert video was not inserted into the target video on a run boundary.

The stss atom associated with the insert video can be directly inserted into the stss of the target video and the new stss atom can be renumbered to reflect the insertion. For example, the insert video indices and those indices in the target video after the stitch can be renumbered.

The stco can also be updated and is related to the stsc. If the stitch occurred at a chunk boundary, then it may be necessary to split up the stsc atom and introduce another stco entry. A new stsc entry can be inserted and all entries can be renumbered after the stitch point. Stco entries up to min(audio_offset, video_offset) can remain the same. All the following stco entries can then be updated to reflect the interleaving change as well as shifting the offsets for the insert video's stco entries and the stco entries after the stitch.

In addition to updating the sample tables, the track and movie header durations can be updated. The insert video and the target video durations can be summed for each track and the headers associated with the stitched video can be updated accordingly.

Figure 2:
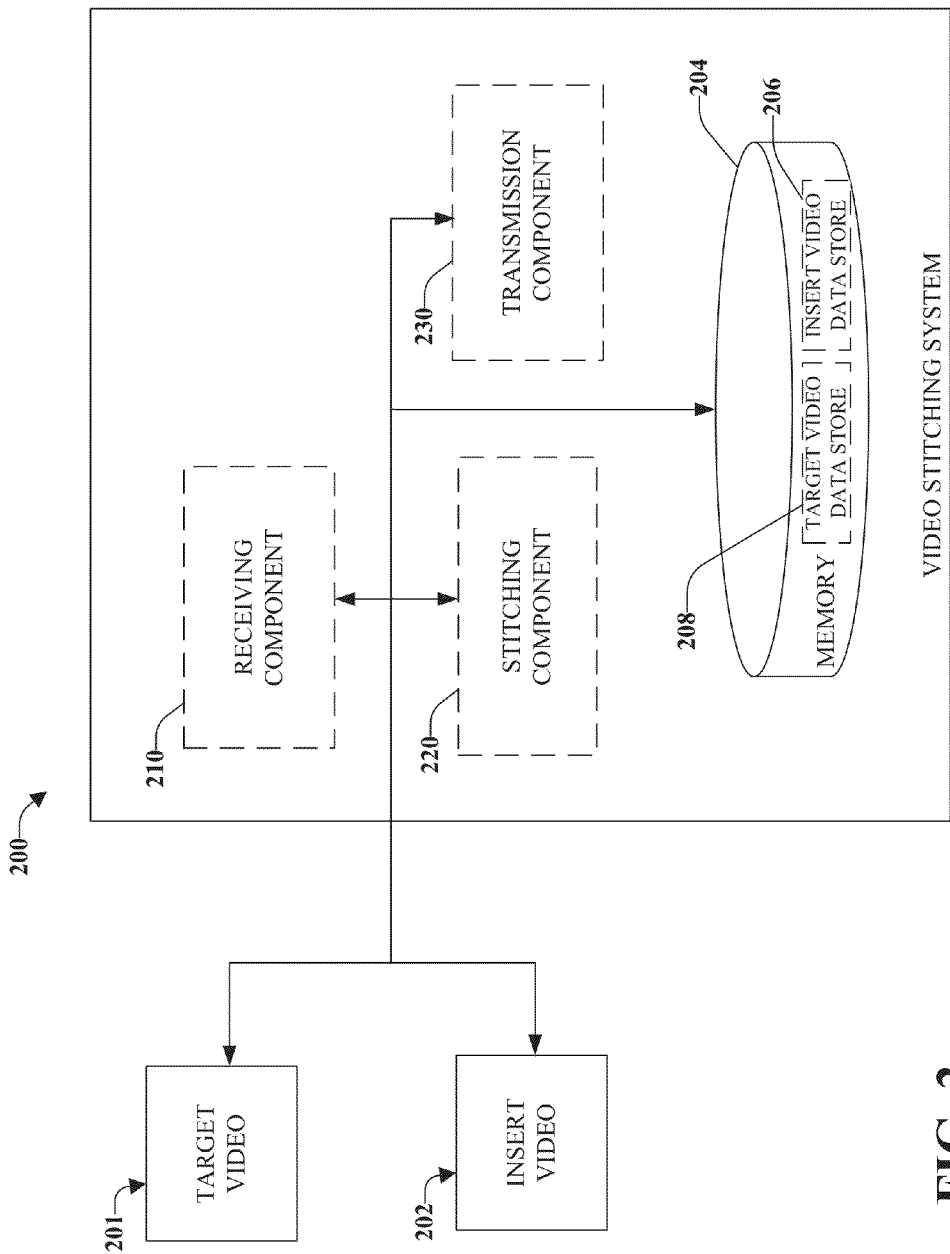
FIG. 2 illustrates a high-level functional block diagram of an example video stitching system in accordance with implementations of this disclosure.

Referring now to FIG. 2, there is illustrated a high-level functional block diagram of an example video stitching system 200 in accordance with implementations of this disclosure.

A receiving component 210 can receive an insert video 202 and a target video 201. In one implementation, insert video 202 is stored within memory 204 in an insert video data store 206. For example, insert video data store 206 can contain a plurality of insert videos relating to advertising, user desires, or any other content that is capable of being inserted into a target video. In one implementation, target video 201 is stored within memory 204 in a target video data store 208. For example, target video data store 208 can store a set of hosted videos that can be accessed via the internet using HTTP. For example, the set of hosted videos could be related to a video sharing platform where users of the video sharing platform have uploaded videos the users desire the video sharing platform to host for others to view. In one implementation, receiving component 210 can receive a target video in response to an HTTP request by a user wishing to view the target video. Both insert video data store 206 and target video date store 208 can be located disparate from video stitching system 200 and accessed via a communications network by system 200. For example, video stitching system 200 could access sets of insert videos and sets of target videos by connecting to a server that is communicatively coupled to server data stores that contain insert video data store 206 and/or target video data store 208.

In one implementation, receiving component 210 can select an insert video 202 from insert video data store 206 based on the target video. For example, for a user that selected a target video relating to basketball, the system may select an insert video 202 from insert video data store 206 that is an advertisement for basketball shoes. In another example, an insert video can be tailored to a user who seeks to watch the target video based on, for example, location or other available information about the user. It can be appreciated that insert video can be selected based on advertising value, content supplementation, or other methods.

In an implementation, the insert video encoding and the target video are encoded using the same encoding settings. For example, both the insert video and the target video can be encoded using any codec supported by the MP4 container, using the same encoding settings. In another example, both the insert video and the target video can be encoded using any codec supported by the 3GP container, using the same encoding settings.

A stitching component 220 can stitch the insert video and the target video without transcoding to generate a stitched video. In one implementation, the stitching component can generate or duplicate an I-frame and insert the I-frame before and after the insert video.

A transmission component 230 can transmit the stitched video. For example, the stitched video can be transmitted using HTTP to a mobile device such as a smart phone, a tablet, an e-reader, a computer, a personal digital assistant, a personal media player, etc. It can be appreciated that because the stitched video is transmitted, the stitched video can be displayed on any video player capable of playing the file format of the stitched video. Video stitching system 200 does not need to be in control of the video player residing on the device that the stitched video is transmitted to in order for the stitched video to be capable of display.

Figure 3:
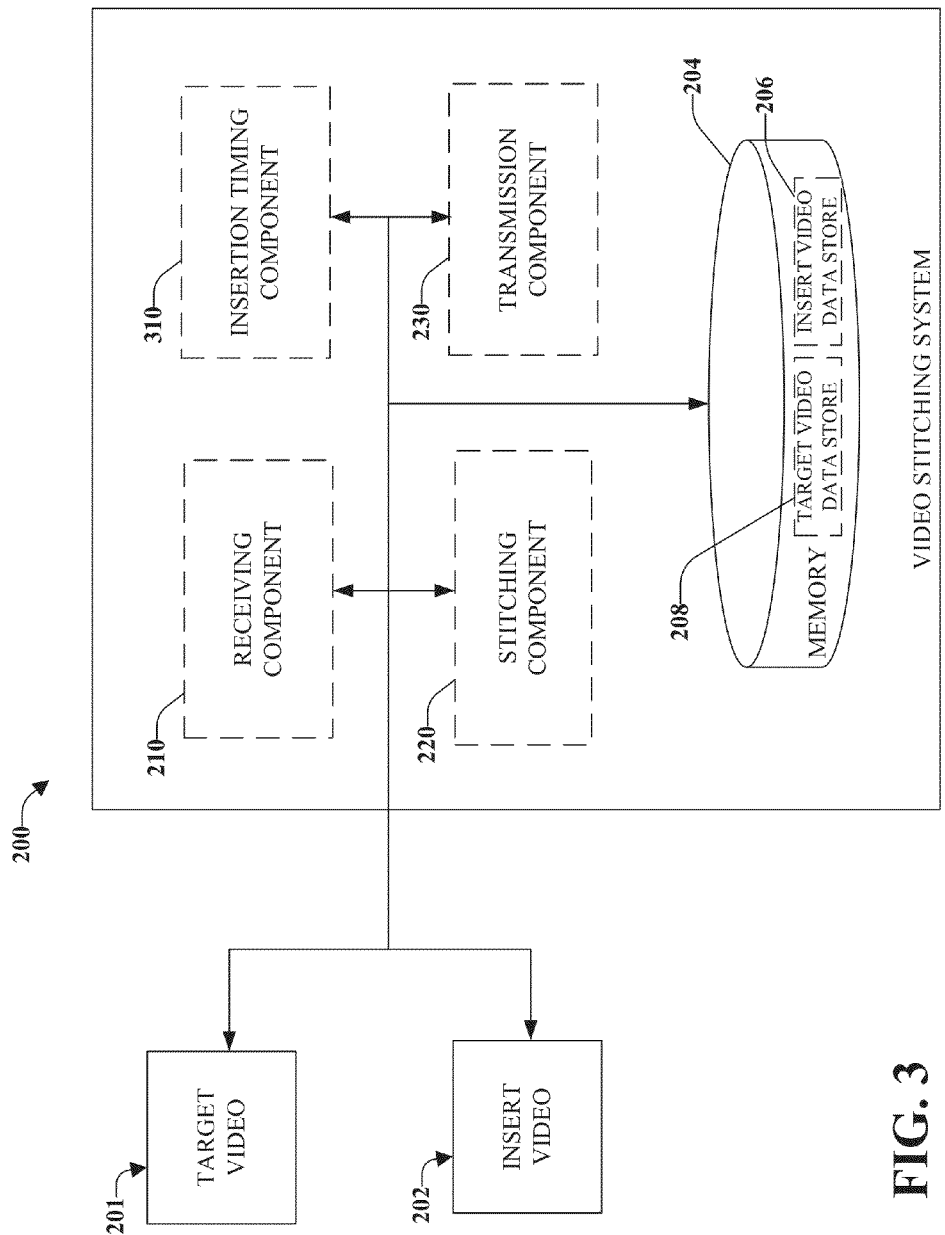
FIG. 3 illustrates a high-level functional block diagram of an example video stitching system including an insertion timing component in accordance with implementations of this disclosure.

Referring to FIG. 3 there is illustrated a high-level functional block diagram of an example video stitching system including an insertion timing component 310 in accordance with implementations of this disclosure. Insertion timing component 310 can determine video insert time and audio insert time. For example, insertion timing component 310 can search the target video for the closest I-frame to a desired insert time using data inside the sample table time to sample ("stts") and sample table synch sample ("stss") atoms. A desired insert time can be based off the entire length of the video so that an effective time is chosen. For example, when using an advertisement as an insert video, it can be desirable to choose a time when the user viewing the stitched video is engaged in watching the video but not a time that is in the middle of a key scene in the video. Once the video insert time has been determined the closest corresponding sample on the audio channel can be used as an audio insert time. In some embodiments, the audio insert time is determined before the video insert time. It can be appreciated that the insertion timing component 310 can include functionality, as more fully described in this disclosure, for example, with regard to FIG. 1.

Figure 4:
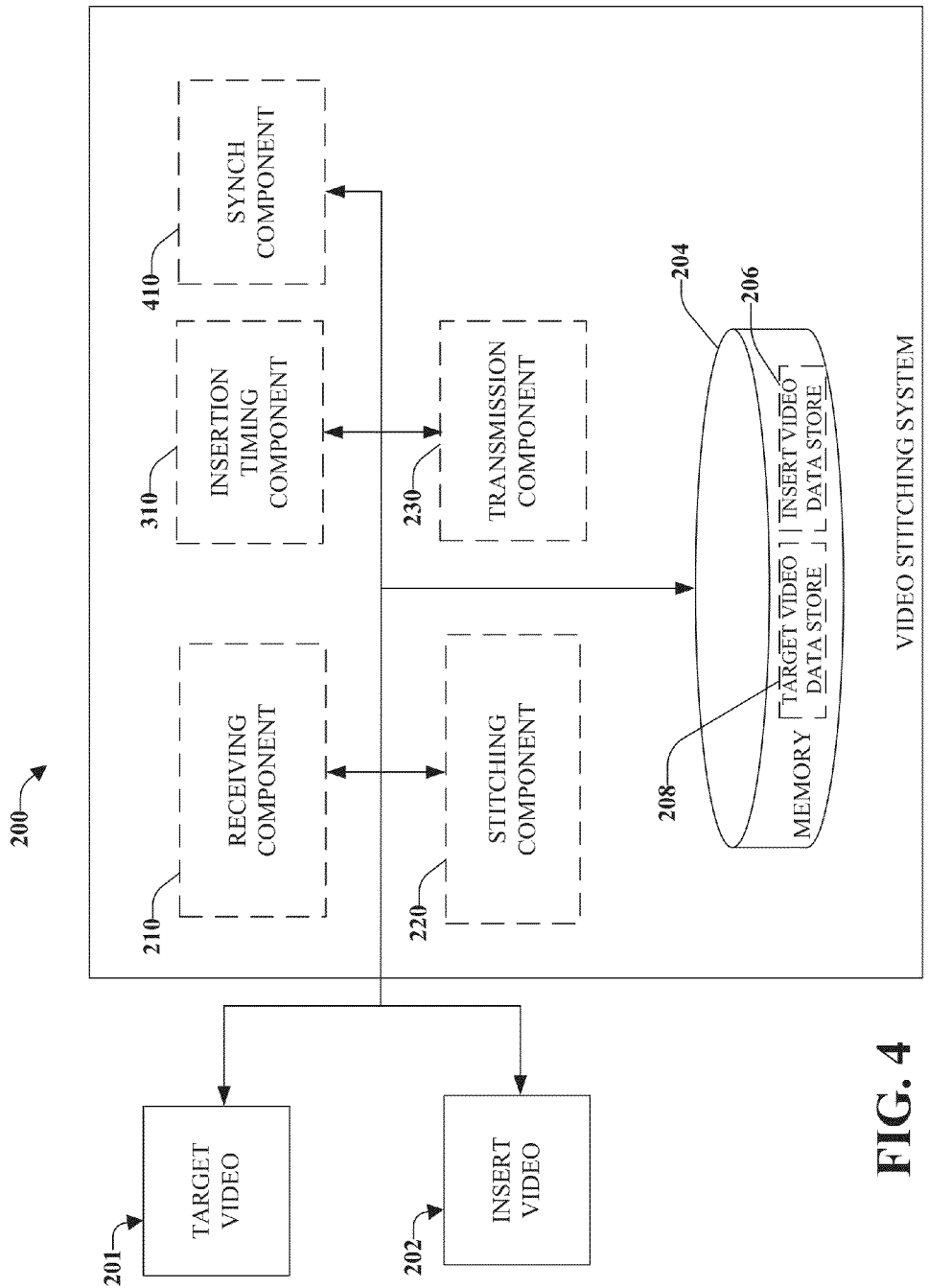
FIG. 4 illustrates a high-level functional block diagram of an example video stitching system including a synch component in accordance with implementations of this disclosure.

Referring to FIG. 4 there is illustrated a high-level functional block diagram of an example video stitching system including a synch component 410 in accordance with implementations of this disclosure. Synch component 410 can determine a pre-stitch remainder or a post-stitch remainder. In one implementation, synch component 410 can determine both a pre-stitch remainder and a post-stitch remainder.

In one implementation, stitching component 220 can generate a stitched video based on a video insert time, an audio insert time, a pre-stitch remainder and a post-stitch remainder. For example, the stitched video can comprise full chunks of mdat data up to the video insert time. A partial chunk of the audio can be included up to the audio_offset. A pre-stitch remainder of a partial chunk of the video up to the video_offset can follow. Next the entirety of the insert video can be added. Then the post-stitch remainder of the remaining partial audio chunk after audio_offset can follow. Finally, the remaining partial video chunk after video_offset follows the post stitch remainder, followed by all remaining full audio and video chunks can be included. It can be appreciated that the pre-stitch remainder and the post-stitch remainder apply in a multiple track situation. If there is a single track, for example, then interleaving may be not applicable. It can be appreciated that the synch component 410 can include functionality, as more fully described in this disclosure, for example, with regard to FIG. 1.

Figure 5:
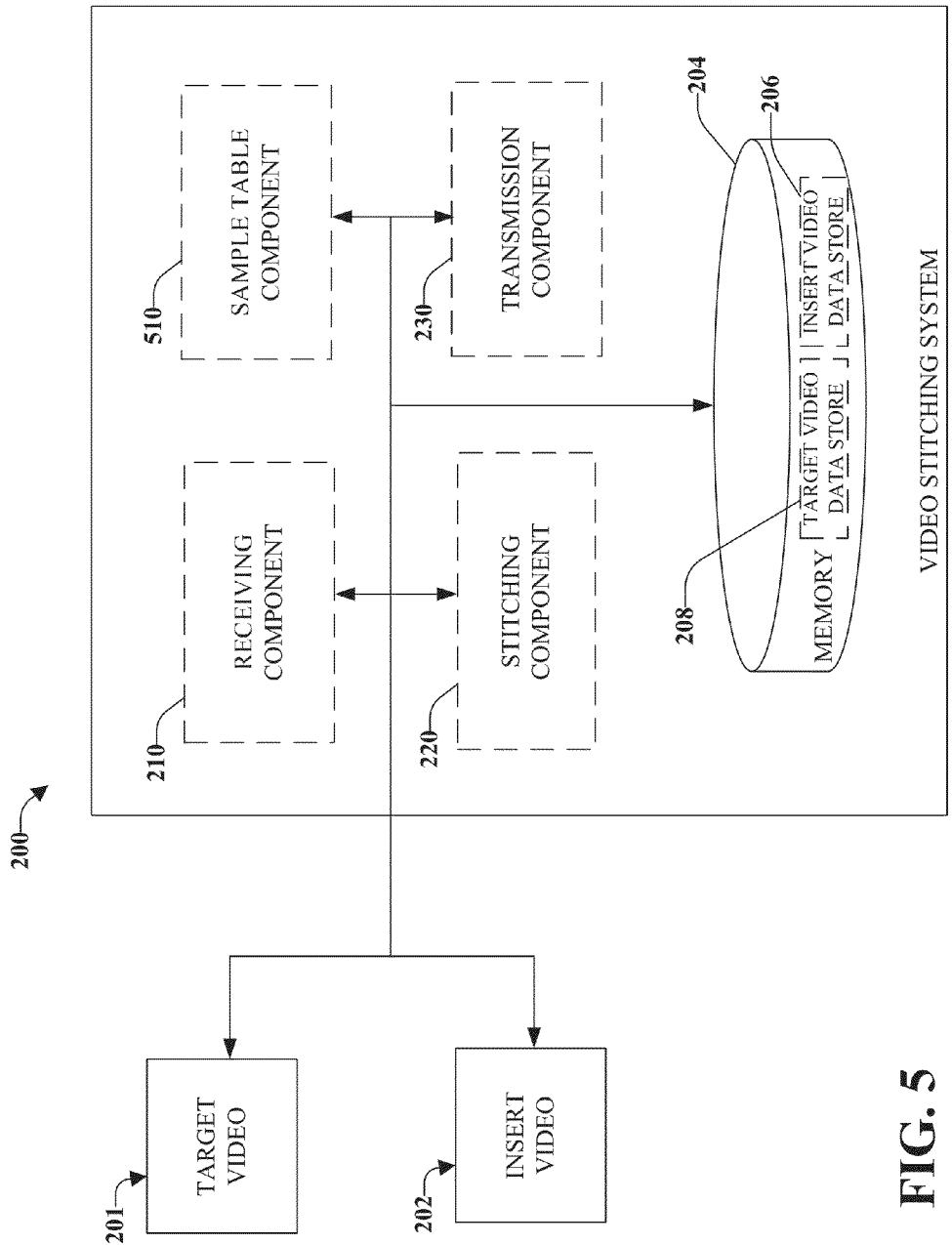
FIG. 5 illustrates a high-level functional block diagram of an example video stitching system including a sample table component in accordance with implementations of this disclosure.

Referring to FIG. 5 there is illustrated a high-level functional block diagram of an example video stitching system including a sample table component 510 in accordance with implementations of this disclosure. Sample table component 510 can generate a stitched video sample table based upon inserting an insert video sample table into a host video sample table. In one implementation, the updated sample tables include at least one of a stts, stsz, stss, or stco atoms. In one implementation, there is one set of sample tables for each track, for example, when there are separate tracks for both audio and video or multiple audio tracks or multiple video tracks. It can be appreciated that the sample table component 510 can include functionality, as more fully described in this disclosure, for example, with regard to FIG. 1.

Figure 6:
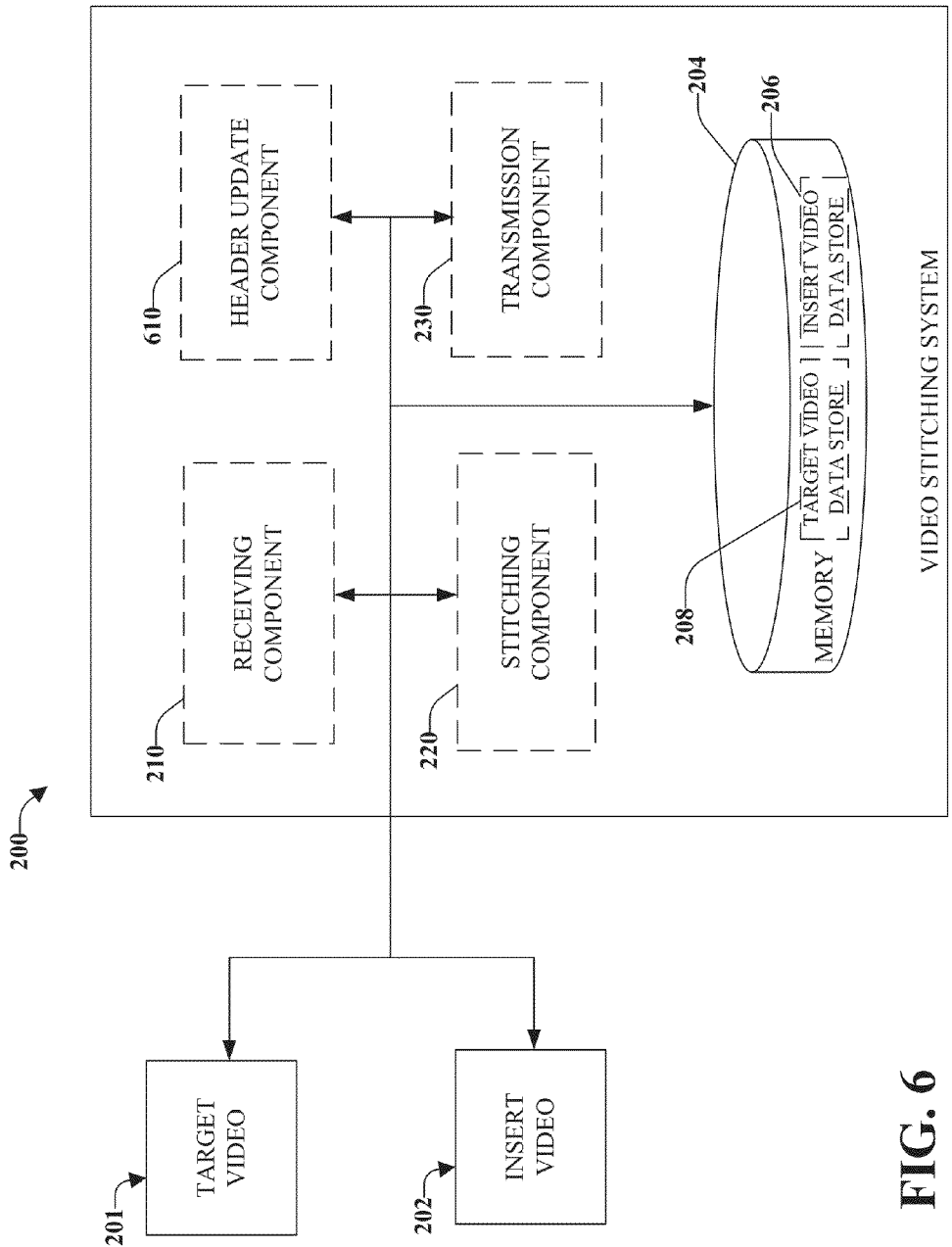
FIG. 6 illustrates a high-level functional block diagram of an example video stitching system including a header update component in accordance with implementations of this disclosure.

Referring to FIG. 6 there is illustrated a high-level functional block diagram of an example video stitching system including a header update component 610 in accordance with implementations of this disclosure. Header update component 610 can generate a stitched video header based on the insert video and the target video. For example, in one implementation, the header update component 610 sums the insert video and the target video durations for each track and updates the headers associated with the stitched video accordingly. It can be appreciated that the header update component 610 can include functionality, as more fully described in this disclosure, for example, with regard to FIG. 1.

Figure 7:
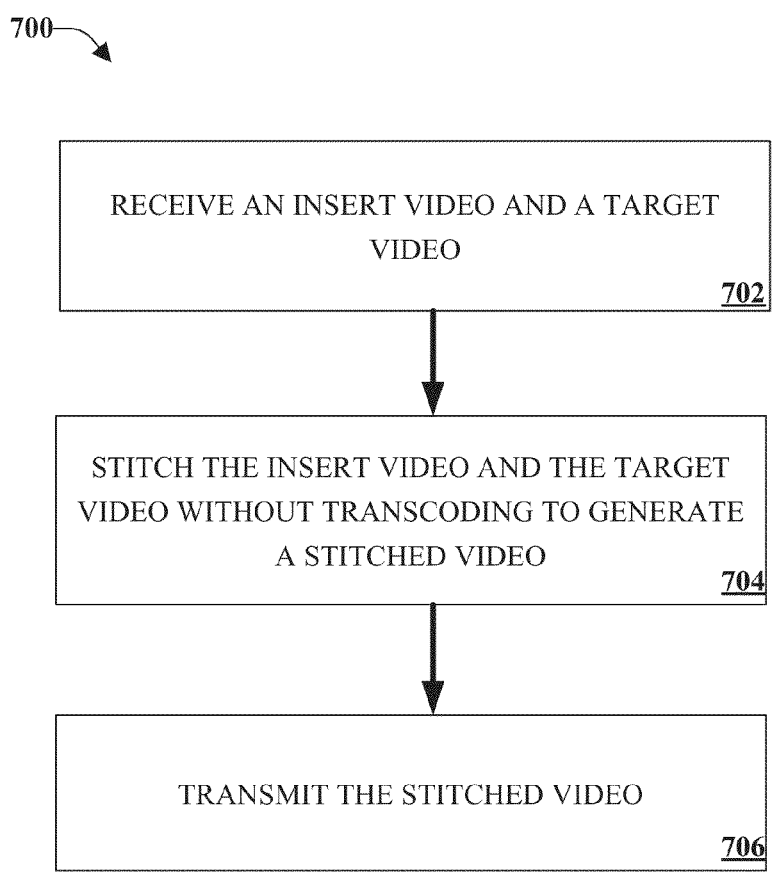
FIG. 7 illustrates an example method for video stitching in accordance with implementations of this disclosure.
Figure 8:
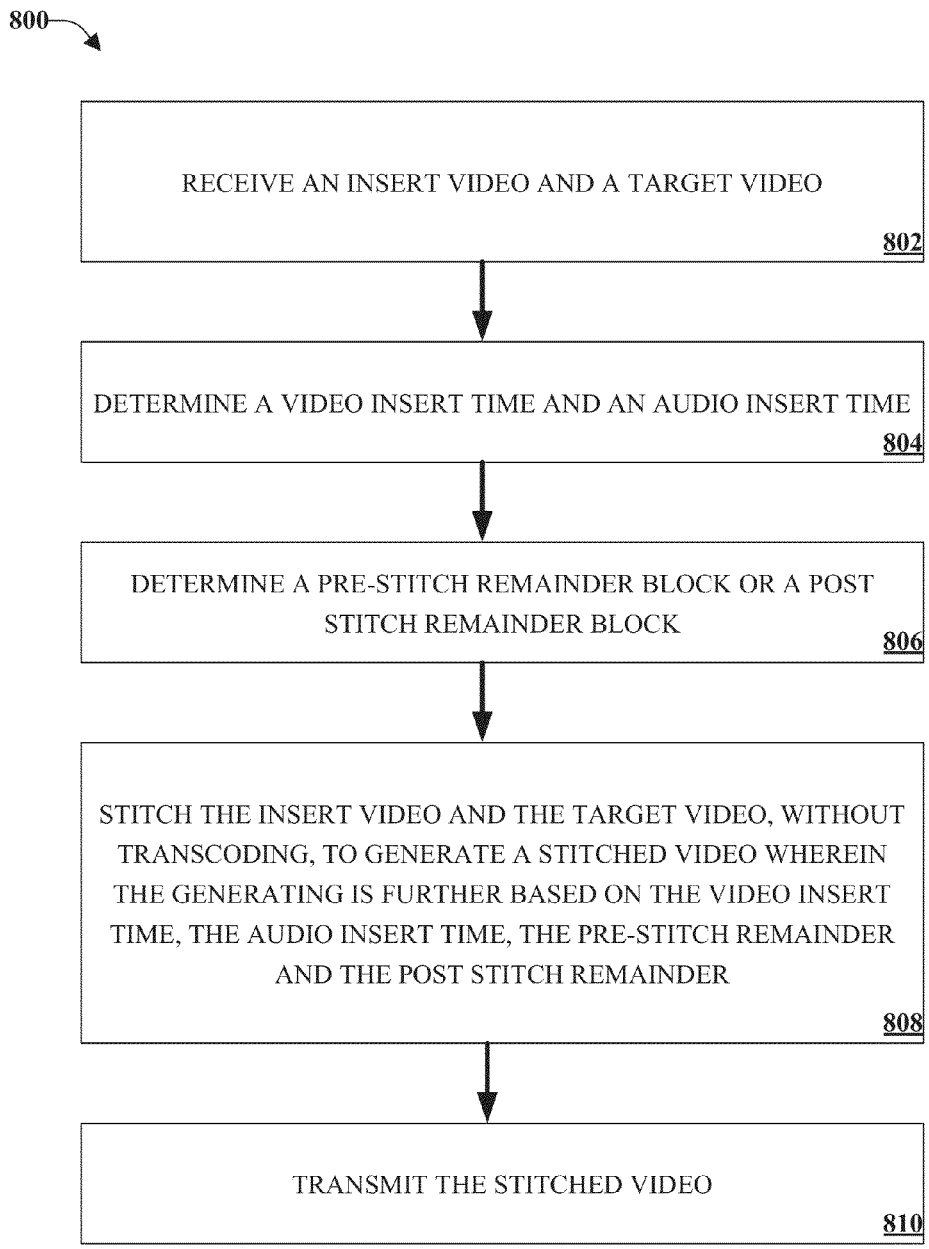
FIG. 8 illustrates an example method for video stitching including determining an insert time in accordance with implementations of this disclosure.

FIGS. 7-8 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methods.

FIG. 7 illustrates an example method video stitching in accordance with implementations of this disclosure. At 702, an insert video and a target video is received (e.g., by a receiving component). In one implementation, the insert video encoding and the target video encoding are the same. In one implementation, the insert video format and the target video format are MPEG-4. In one implementation, the insert video format and the target video format are 3GP. At 704, the insert video is stitched (e.g., by a stitching component) into the target video without transcoding to generate a stitched video. In one implementation, an I-frame can be generated and inserted before and after the insert video. At 706, the stitched video is transmitted (e.g., by a transmission component). For example, the stitched video can be transmitted using HTTP to a mobile device such as a smart phone, a tablet, an e-reader, a computer, a personal digital assistant, a personal media player, etc. It can be appreciated that the stitched video can be displayed on any video player capable of playing the file format of the stitched video.

FIG. 8 illustrates an example method for video stitching including determining an insert time in accordance with implementations of this disclosure. At 802, an insert video and a target video is received (e.g., by a receiving component). At 804, a video insert time and an audio insert time is determined (e.g., by an insertion timing component). At 806, a pre-stitch remainder chunk or a post-stitch remainder chunk is determined (e.g., by a synch component). At 808, the insert video is stitched (e.g., by a stitching component) with the target video, without transcoding, to generate a stitched video. For example, the insert video can be stitched with the target video, without transcoding, to generate a stitched video based on the video insert time, the audio insert time, the pre-stitch remainder and the post-stitch remainder. At 810, the stitched video is transmitted (e.g., by a transmission component).

Figure 9:
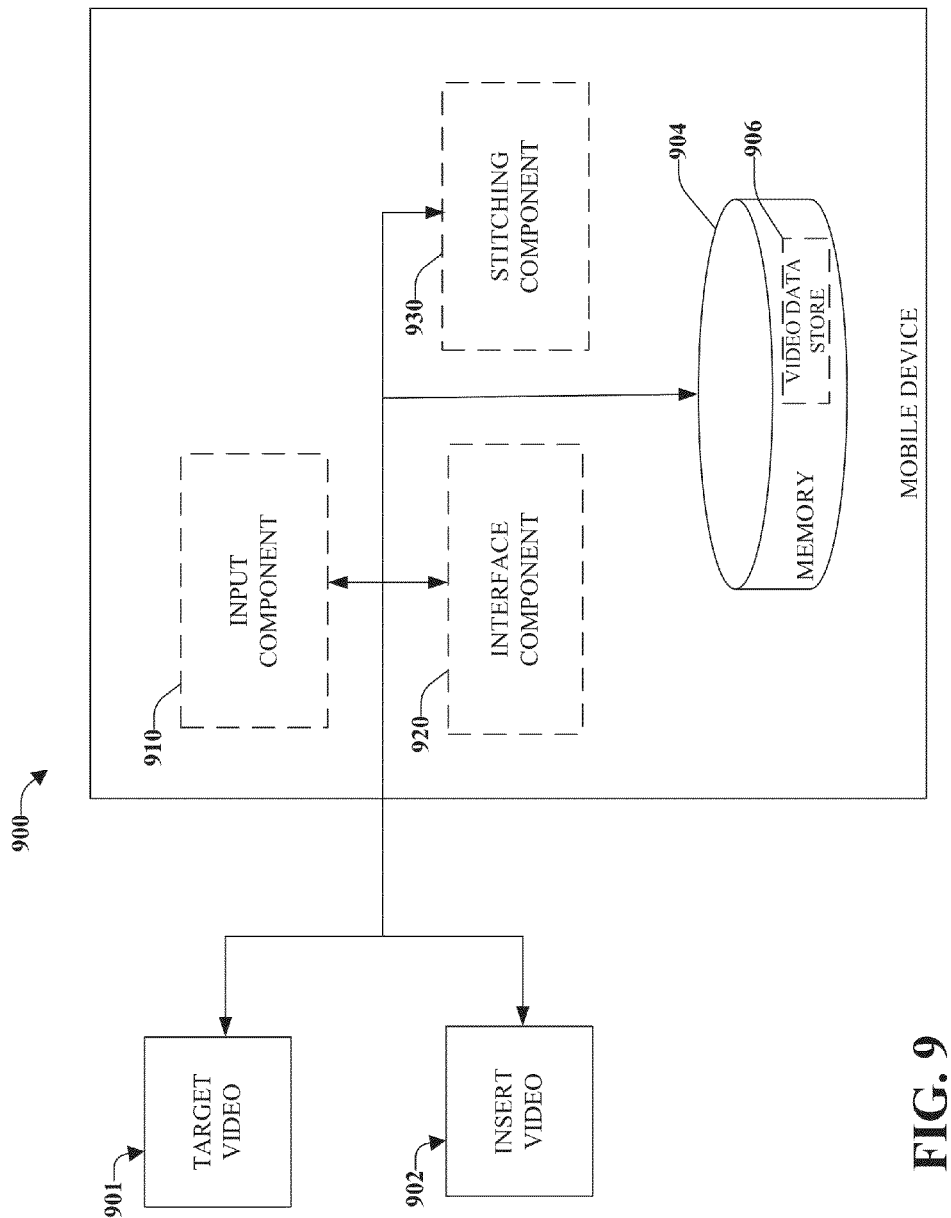
FIG. 9 illustrates a high-level functional block diagram of an example mobile device capable of video stitching in accordance with implementations of this disclosure.

Referring to FIG. 9, there is illustrated a high-level functional block diagram of an example mobile device 900 capable of video stitching in accordance with implementations of this disclosure. An example mobile device can include a smart phone, a tablet, an e-reader, a laptop, a netbook, a personal digital assistant, a personal media player, etc.

An input component 910 can receive an insert video 902 and a target video 901. In one implementation, insert video 902 and target video 901 can be received from a video data store 906 in memory 904, which can be embedded inside mobile device 900 or coupled thereto. For example, a user of the mobile device may wish to combine two videos stored within video data store 906, which may be a SIM card, for example. In one implementation, both the insert video and the target video are MPEG-4 videos. In one implementation, both the insert video and the target video are 3GP videos. In another implementation, both the insert video and the target video are the same resolution and encoded using the same encoding settings.

Interface component 920 can allow a user of the mobile device to select an insert time in the target video. In one implementation, the user can input a specific time in which they want the insert video to appear within the target video. In another implementation, the user can visually select an approximate point in the target video where he/she desires the insert video to be stitched.

Stitching component 930 can stitch the insert video into the target video at the insert time (or a nearby time) without transcoding to generate a stitched video. In one implementation, stitching component 930 generates or duplicates an I-frame and inserts the I-frame before and after the insert video.

Figure 10:
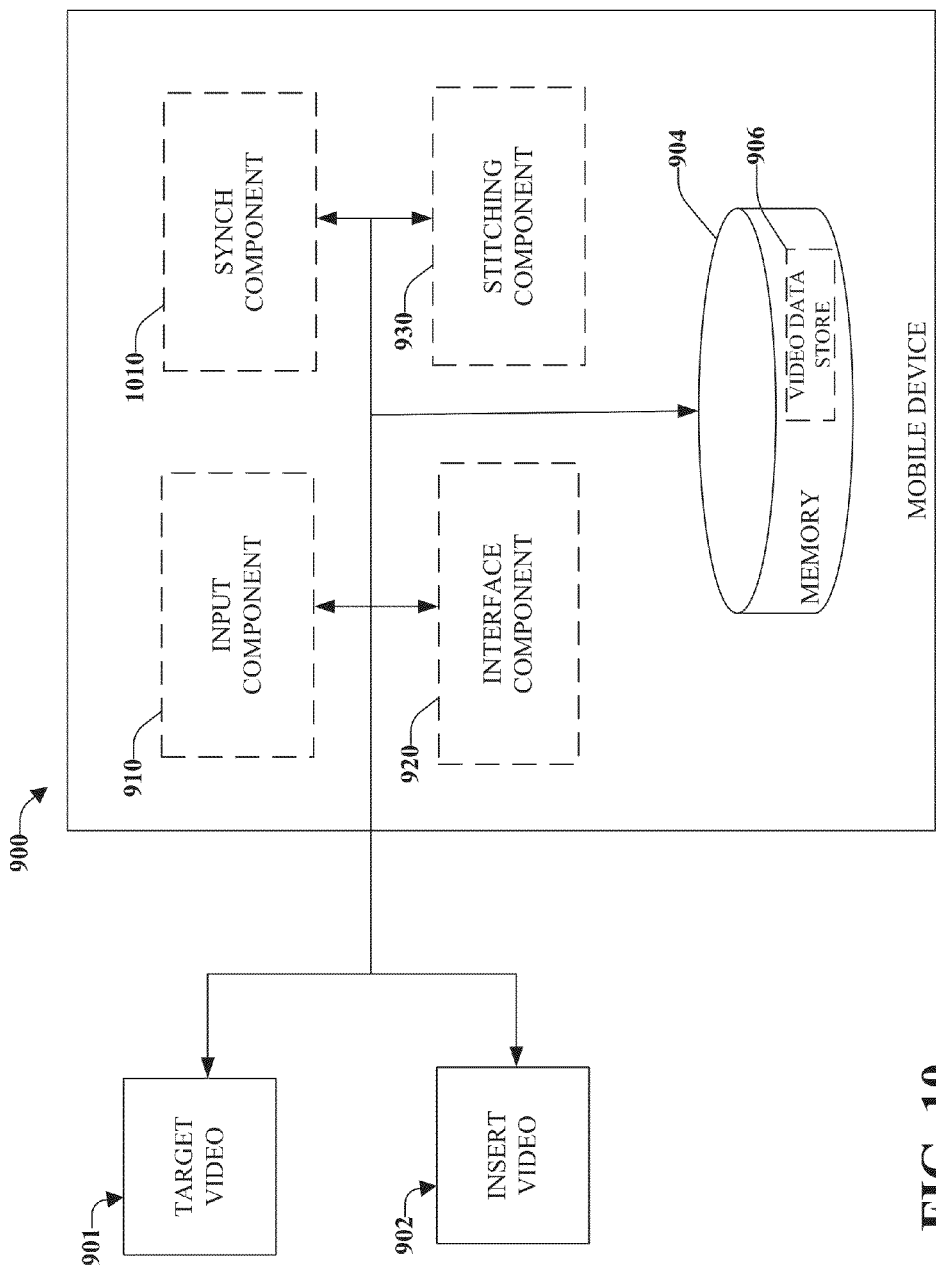
FIG. 10 illustrates a high-level functional block diagram of an example mobile device capable of video stitching including a synch component in accordance with implementations of this disclosure.

FIG. 10 illustrates a high-level functional block diagram of an example mobile device 900 capable of video stitching including a synch component 1010 in accordance with implementations of this disclosure. Synch component 1010 can determine a pre-stitch remainder block and/or a post-stitch remainder block. In one implementation, stitching component 930 can generate the stitched video based on the insert time, the pre-stitch remainder and the post-stitch remainder. It can be appreciated that the synch component 1010 can include functionality, as more fully described in this disclosure, for example, with regard to FIG. 1 and/or synch component 410.

Figure 11:
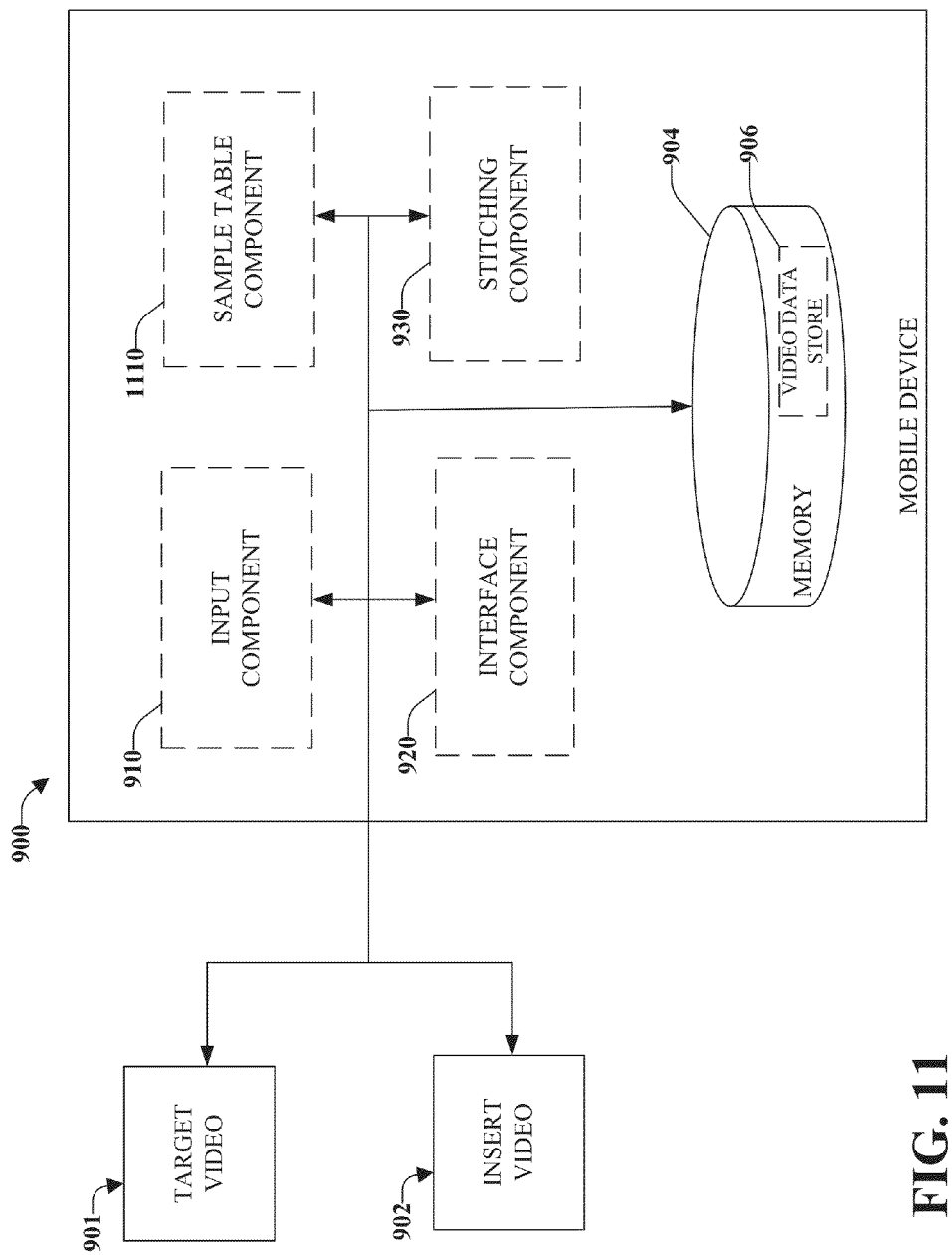
FIG. 11 illustrates a high-level functional block diagram of an example mobile device capable of video stitching including a sample table component in accordance with implementations of this disclosure.

FIG. 11 illustrates a high-level functional block diagram of an example mobile device 900 capable of video stitching including a sample table component 1110 in accordance with implementations of this disclosure. Sample table component 1110 can generate a stitched video sample table based upon inserting an insert video sample table into a target video sample table. In one implementation, the stitched video sample table includes at least one of a stts, stsz, stss, or stco atoms. It can be appreciated that the sample table component 1110 can include functionality, as more fully described in this disclosure, for example, with regard to FIG. 1 and/or sample table component 510.

Figure 12:
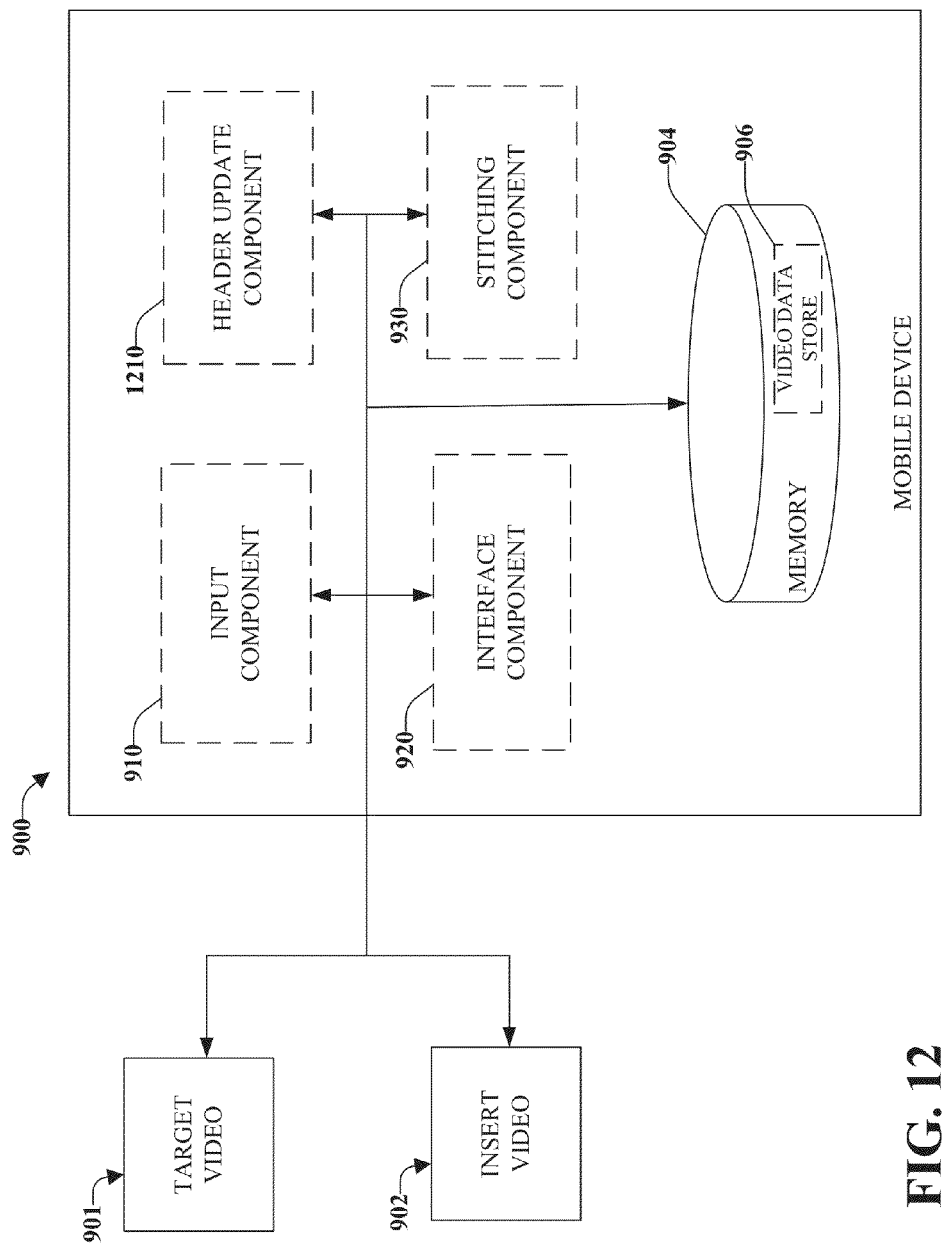
FIG. 12 illustrates a high-level functional block diagram of an example mobile device capable of video stitching including a header update component in accordance with implementations of this disclosure.

FIG. 12 illustrates a high-level functional block diagram of an example mobile device 900 capable of video stitching including a header update component 1210 in accordance with implementations of this disclosure. Header update component 1210 can generate a stitched video header based on the insert video and the target video. For example, in one implementation, the header update component 1210 sums the insert video and the target video durations for each track and updates the headers associated with the stitched video accordingly. It can be appreciated that the header update component 1210 can include functionality, as more fully described in this disclosure, for example, with regard to FIG. 1 and/or header update component 610.

Reference throughout this specification to "one implementation," or "an implementation," or "one embodiment," or "an embodiment" means that a particular feature, structure, or characteristic described in connection with the implementation or embodiment is included in at least one implementation or one embodiment. Thus, the appearances of the phrase "in one implementation," or "in an implementation," or "in one embodiment," or "in an embodiment" in various places throughout this specification can, but are not necessarily, referring to the same implementation or embodiment, depending on the circumstances. Furthermore, the particular features, structures, or characteristics may be combined in any suitable manner in one or more implementations or embodiments.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or fingerprints); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 13:
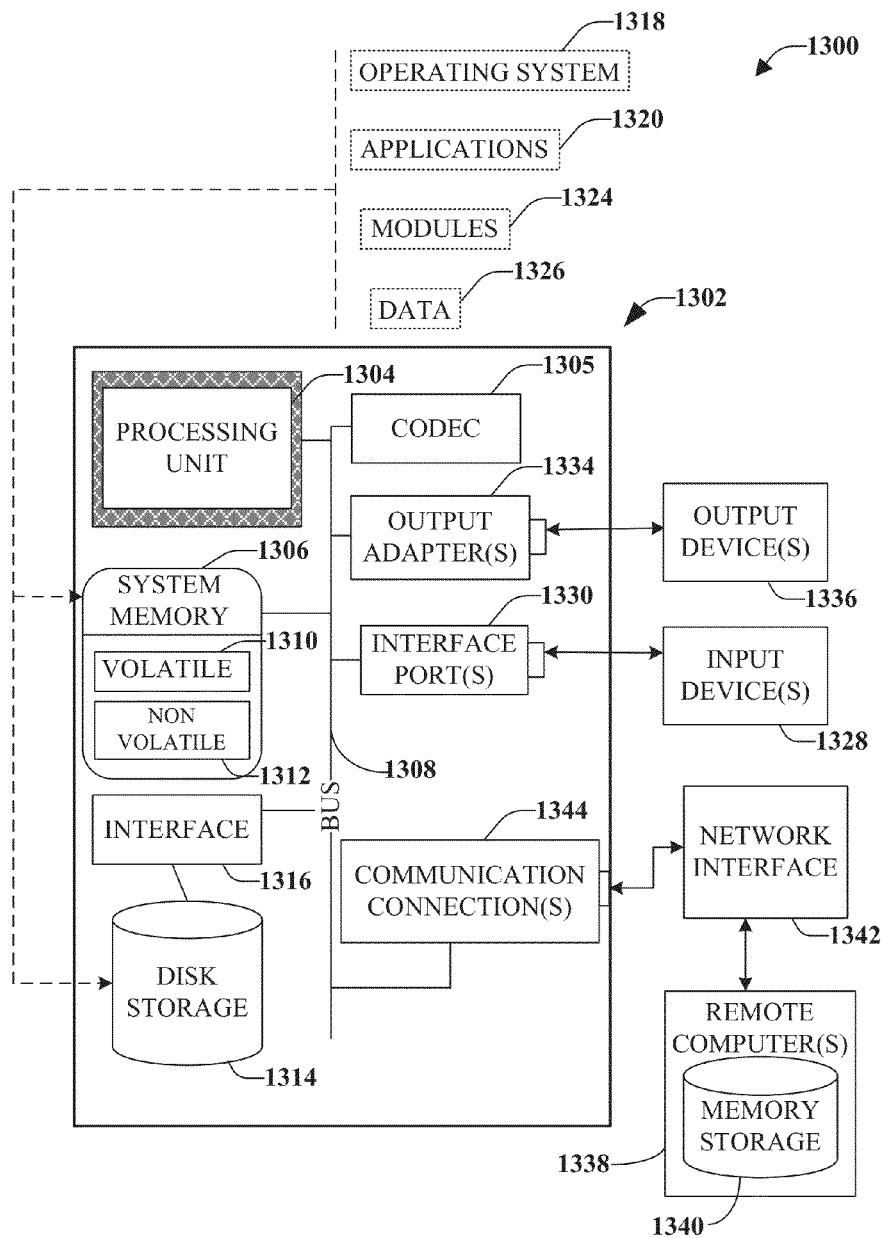
FIG. 13 illustrates an example block diagram of a computer operable to execute the disclosed architecture in accordance with implementations of this disclosure.

With reference to FIG. 13, a suitable environment 1300 for implementing various aspects of the claimed subject matter includes a computer 1302. The computer 1302 includes a processing unit 1304, a system memory 1306, a codec 1305, and a system bus 1308. Codec 1305 can include video codecs such as MP4, 3GP, etc. and/or related audio codecs that can be used to encode, decode or transcode video and related audio. The system bus 1308 couples system components including, but not limited to, the system memory 1306 to the processing unit 1304. The processing unit 1304 can be any of various available processors. Dual microprocessors and other multi-processor architectures also can be employed as the processing unit 1304.

The system bus 1308 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1306 includes volatile memory 1310 and non-volatile memory 1312. The basic input/output system (BIOS), containing the basic routines to transfer information between elements within the computer 1302, such as during start-up, is stored in non-volatile memory 1312. By way of illustration, and not limitation, non-volatile memory 1312 can include read only memory (ROM), programmable ROM (PROM), electrically programmable ROM (EPROM), electrically erasable programmable ROM (EEPROM), or flash memory. Volatile memory 1310 includes random access memory (RAM), which acts as external cache memory. According to present aspects, the volatile memory may store the write operation retry logic (not shown in FIG. 13) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ES-DRAM).

Computer 1302 may also include removable/non-removable, volatile/non-volatile computer storage media. FIG. 13 illustrates, for example, a disk storage 1314. Disk storage 1314 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1314 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1314 to the system bus 1308, a removable or non-removable interface is typically used, such as interface 1316.

It is to be appreciated that FIG. 13 describes software that acts as an intermediary between users and the basic computer resources described in the suitable operating environment 1300. Such software includes an operating system 1318. Operating system 1318, which can be stored on disk storage 1314, acts to control and allocate resources of the computer system 1302. Applications 1320 take advantage of the management of resources by operating system 1318 through program modules 1324, and program data 1326, such as the boot/shutdown transaction table and the like, stored either in system memory 1306 or on disk storage 1314. It is to be appreciated that the claimed subject matter can be implemented with various operating systems or combinations of operating systems.

A user enters commands or information into the computer 1302 through input device(s) 1328. Input devices 1328 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1330. Interface port(s) 1330 include, for example, a serial port, a parallel port, a game port, and a universal serial bus (USB). Output device(s) 1336 use some of the same type of ports as input device(s) 1328. Thus, for example, a USB port may be used to provide input to computer 1302, and to output information from computer 1302 to an output device 1336. Output adapter 1334 is provided to illustrate that there are some output devices 1336 like monitors, speakers, and printers, among other output devices 1336, which require special adapters. The output adapters 1334 include, by way of illustration and not limitation, video and sound cards that provide a means of connection between the output device 1336 and the system bus 1308. It should be noted that other devices and/or systems of devices provide both input and output capabilities such as remote computer(s) 1338.

Computer 1302 can operate in a networked environment using logical connections to one or more remote computers, such as remote computer(s) 1338. The remote computer(s) 1338 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1340 is illustrated with remote computer(s) 1338.

Remote computer(s) 1338 is logically connected to computer 1302 through a network interface 1342 and then connected via communication connection(s) 1344. Network interface 1342 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1344 refers to the hardware/software employed to connect the network interface 1342 to the bus 1308. While communication connection 1344 is shown for illustrative clarity inside computer 1302, it can also be external to computer 1302. The hardware/software necessary for connection to the network interface 1342 includes, for exemplary purposes only, internal and external technologies such as, modems including regular telephone grade modems, cable modems and DSL modems, ISDN adapters, and wired and wireless Ethernet cards, hubs, and routers.

Figure 14:
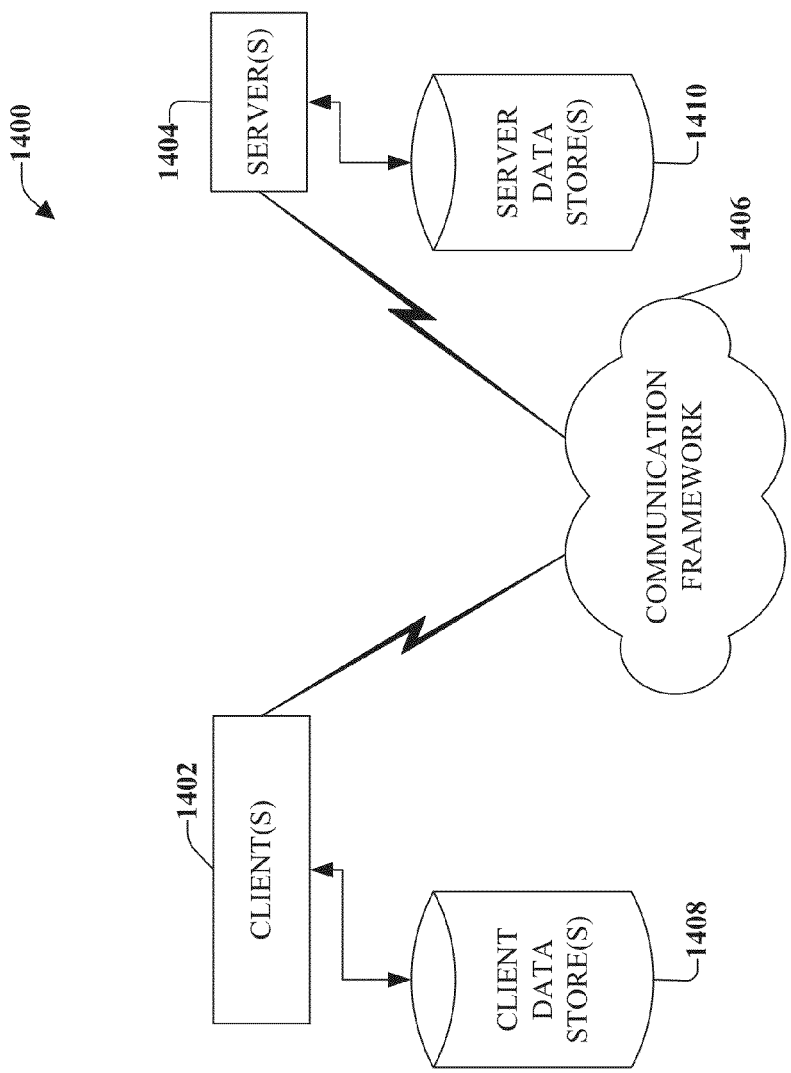
FIG. 14 illustrates an example schematic block diagram for a computing environment in accordance with implementations of this disclosure.

Referring now to FIG. 14, there is illustrated a schematic block diagram of a computing environment 1400 in accordance with the subject specification. The system 1400 includes one or more client(s) 1402, which can include an application or a system that accesses a service on the server 1404. The client(s) 1402 can be hardware and/or software (e.g., threads, processes, computing devices). The client(s) 1402 can house cookie(s), metadata, and/or associated contextual information by employing the specification, for example.

The system 1400 also includes one or more server(s) 1404. The server(s) 1404 can also be hardware or hardware in combination with software (e.g., threads, processes, computing devices). The servers 1404 can house threads to perform, for example, receiving, stitching videos, generating sample tables, generating I-frames, generating headers, etc. in accordance with the subject disclosure. One possible communication between a client 1402 and a server 1404 can be in the form of a data packet adapted to be transmitted between two or more computer processes where the data packet contains, for example, an audio sample or descriptors associated with an audio sample. The data packet can include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system, comprising:
a memory that has stored thereon computer executable components;
a processor that executes the following computer executable components stored in the memory:
a receiving component that receives an insert video and a target video;
an insertion timing component that determines a video insert time for the target video and identifies an I-frame in the target video nearest to the video insert time; and
a stitching component that stitches the insert video within the target video immediately prior to the I-frame and stitches a copy of the I-frame within the target video immediately prior to the insert video without transcoding to generate a stitched video.

2. The system of claim 1, wherein the target video comprises an audio track and the insertion timing component determines an audio sample within the audio track nearest to the video insertion time and inserts an audio portion of the insert video into the audio track immediately prior to the audio sample.

3. The system of claim 1, further comprising a synch component that determines at least one of a pre-stitch remainder or a post-stitch remainder, wherein the target video comprises a plurality of chunks, the pre-stitch remainder is a portion of a chunk of the target video immediately prior to the video insert time and the post-stitch remainder is a portion of a chunk of the target video immediately after the video insert time.

4. The system of claim 3, wherein the stitching component generates the stitched video based on at least one of the pre-stitch remainder or the post-stitch remainder.

5. The system of claim 3, wherein the plurality of chunks are video chunks.

6. The system of claim 3, wherein the plurality of chunks are audio chunks.

7. The system of claim 1, further comprising a sample table component that generates a sample table of the stitched video comprising at least one of a sample table sizes table, a sample table sample to chunk map table, or a sample table chunk offset sample table.

8. The system of claim 1, further comprising a transmission component that transmits the stitched video.

9. A method comprising:
receiving, by a system including a processor, an insert video and a target video;
determining, by the system, a video insert time for the target video;
identifying, by the system, an I-frame in the target video nearest to the video insert time;
stitching, by the system, the insert video within the target video immediately prior to the I-frame and stitches a copy of the I-frame within the target video immediately prior to the insert video without transcoding to generate a stitched video.

10. The method of claim 9, further comprising:
wherein the target video comprises an audio track;
determining an audio sample within the audio track nearest to the video insertion time; and
inserting an audio portion of the insert video into the audio track immediately prior to the audio sample.

11. The method of claim 9, further comprising transmitting, by the system, the stitched video.

12. The method of claim 9, further comprising determining at least one of a pre-stitch remainder or a post-stitch remainder, wherein the target video comprises a plurality of chunks, the pre-stitch remainder is a portion of a chunk of the target video immediately prior to the video insert time and the post-stitch remainder is a portion of a chunk of the target video immediately after the video insert time.

13. The method of claim 12, wherein the generating the stitched video is further based on at least one of the pre-stitch remainder or the post-stitch remainder.

14. The method of claim 9, further comprising generating a sample table of the stitched video comprising at least one of a sample table sizes table, a sample table sample to chunk map table, or a sample table chunk offset sample table.

15. The method of claim 9, further comprising generating a stitched video header based on the stitched video.

16. A non-transitory computer-readable device having instructions stored thereon that, in response to execution, cause a system including a processor to perform operations comprising:
receiving an insert video and a target video;
determining a video insert time for the target video;
identifying an I-frame in the target video nearest to the video insert time; and
stitching the insert video within the target video immediately prior to the I-frame and stitches a copy of the I-frame within the target video immediately prior to the insert video without transcoding to generate a stitched video.

17. The non-transitory computer-readable device of claim 16, further comprising:
wherein the target video comprises an audio track;

determining an audio sample within the audio track nearest to the video insertion time; and inserting an audio portion of the insert video into the audio track immediately prior to the audio sample.

18. The non-transitory computer-readable device of claim 16, further comprising determining at least one of a pre-stitch remainder or a post-stitch remainder, wherein the target video comprises a plurality of chunks, the pre-stitch remainder is a portion of a chunk of the target video immediately prior to the video insert time and the post-stitch remainder is a portion of a chunk of the target video immediately after the video insert time.

19. The non-transitory computer-readable device of claim 18, wherein the generating the stitched video is further based on at least one of the pre-stitch remainder or the post-stitch remainder.

20. The non-transitory computer-readable device of claim 16, further comprising generating a sample table of the stitched video comprising at least one of a sample table sizes table, a sample table sample to chunk map table, or a sample table chunk offset sample table.

* * * * *